M. C. ARMSTRONG.
MECHANICAL MOVEMENT.
APPLICATION FILED JAN. 2, 1917.
1,222,712.
Patented Apr. 17, 1917.
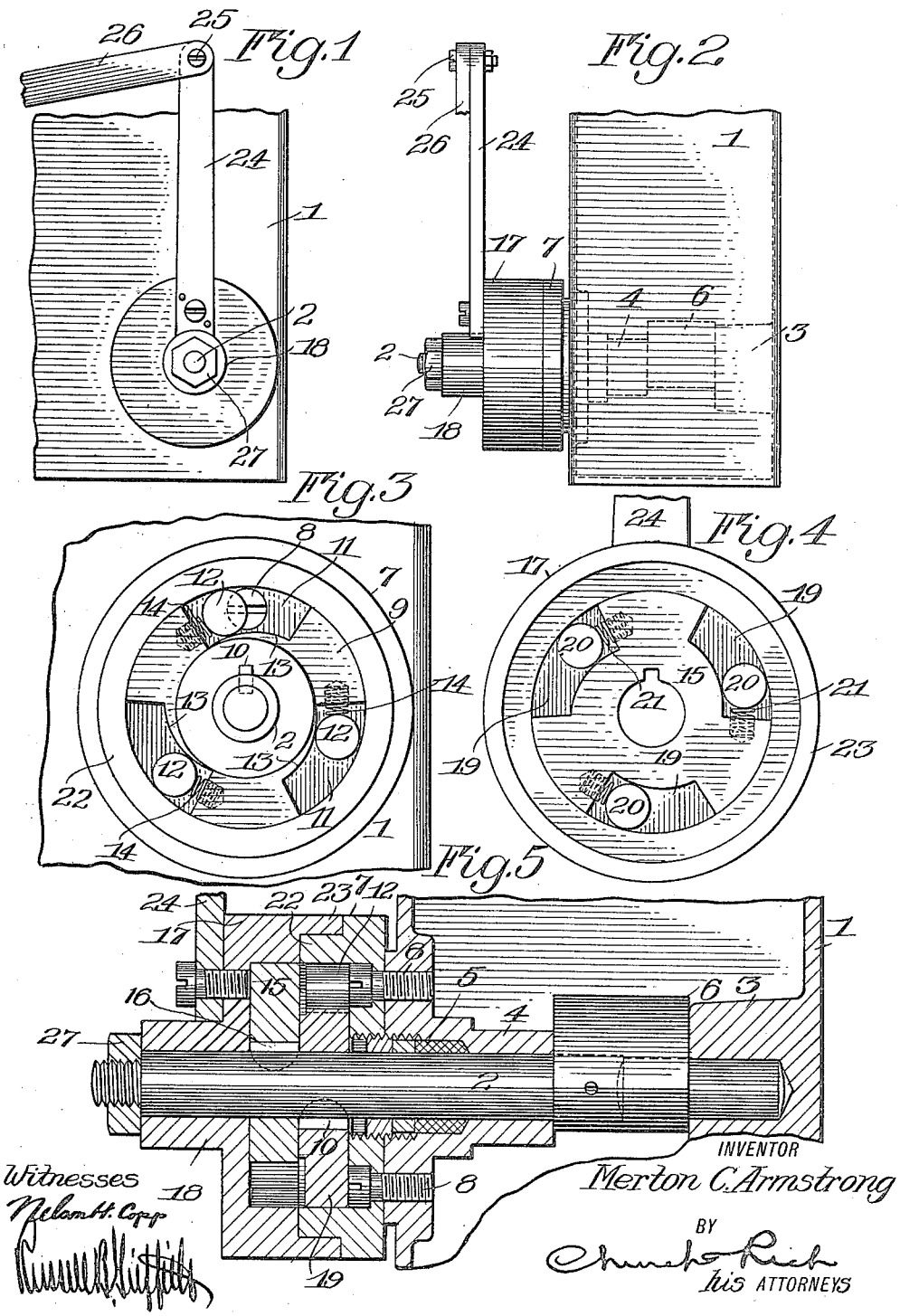
INVENTOR
Merton C. Armstrong
BY
his ATTORNEYS
Witnesses

UNITED STATES PATENT OFFICE.

MERTON C. ARMSTRONG, OF ROCHESTER, NEW YORK, ASSIGNOR TO THE INTERSTATE MACHINE PRODUCTS COMPANY, INC., OF ROCHESTER, NEW YORK, A CORPORATION OF NEW YORK.

MECHANICAL MOVEMENT.

1,222,712.  Specification of Letters Patent.  Patented Apr. 17, 1917.

Application filed January 2, 1917. Serial No. 140,280.

*To all whom it may concern:*

Be it known that I, MERTON C. ARMSTRONG, of Rochester, in the county of Monroe and State of New York, have invented certain new and useful Improvements in Mechanical Movements; and I do hereby declare the following to be a full, clear, and exact description of the same, reference being had to the accompanying drawings, forming a part of this specification, and to the reference-numerals marked thereon.

My present invention relates to mechanical movements and more particularly to intermittently acting rotary driving mechanisms and the invention has for its object to provide a simple, cheap and sightly device of this character that will rotate a shaft step by step by picking up and then releasing it and will accomplish this without lost motion or back-lash. Further objects of the invention are to produce a mechanism that will be strong and durable and be composed of relatively few parts easily assembled. To these and other ends the invention resides in certain improvements and combinations of parts, all as will be hereinafter more fully described, the novel features being pointed out in the claims at the end of the specification.
In the drawings:

Figure 1 is an elevation of an intermittent drive mechanism constructed in accordance with and illustrating one embodiment of my invention;
Fig. 2 is a side view thereof;

Fig. 3 is an enlarged end view of the shaft with the driving parts removed and the braking parts revealed;

Fig. 4 is an interior view of the driving member and driving shell, also enlarged, and Fig. 5 is an enlarged sectional view taken centrally through the shaft.

Similar reference numerals throughout the several views indicate the same parts.

The device of the present embodiment has been designed as a driving means for a force feed lubricator or oil pump and it will be convenient to describe it in this connection. The reservoir or pump casing 1 forms a support for a shaft 2 journaled therein at 3 and 4 and provided with a gland 5. Between the bearings 3 and 4 is an eccentric 6 to which the operating parts are connected up. The outer end of the shaft projects from the casing or support and encircling it, next adjacent to the latter, is a brake casing or shell 7 screwed to the support at 8 to constitute a fixed member. Within this shell is a disk shaped brake member 9 keyed to the shaft 2 at 10 and having its outer face flush with the outer face of the brake shell. Peripheral chambers 11 in the brake member 9 contain rollers 12 in contact with the bottoms of the chambers which are on the brake member and with the top walls of the chambers which are furnished by the inner periphery of the shell 7. The bottom walls 13 are eccentric or cam shaped, as shown in Fig. 3, making the chambers narrower at the right hand ends than at the left. At the left of the rollers 12 are springs 14 which tend to thrust the rollers toward the narrow end of the chamber and wedge them between the brake member 9 and the brake shell 7. When it is attempted to turn the shaft to the left, this wedging action immediately occurs and hence the brake member and brake shell are locked together and the brake shell being fixed and the brake member being removable on the shaft, the latter is locked against rotation in that direction.

Disposed against the outer face of the brake member 9 is a driving member 15 keyed to the shaft 2 at 16 and contained within a driving shell 17 having a hub 18 and adapted to turn freely on the shaft. This driving member 15 is formed exactly like the brake member 9 (Fig. 4) and bears the same relationship to its shell as does the brake member to the brake shell except that the chambers 19 are alternated with the chambers 11. Each chamber 19 contains a clutch roller 20 and a spring 21 on the left thereof forcing it toward the small right end of the chamber when the parts are assembled. There is a reversal in the action of the clutches, however, for the reason that the driving shell 17, when moved to the right, (or to the left in Fig. 4) is the moving element and the driving member 15 the resisting element, so that the clutch roller is rolled toward the small end of the chamber and jammed, locking the shell 17, member 15 and shaft 2 together to rotate the shaft to the right, while simultaneously in the other combination, the brake member 9 is the moving element and the brake shell

7 the resisting element and the clutch 12 is held away from the small end of the chamber 11.

Thus, upon turning the driving shell 17 to the right, the shaft is rotated while with the reversal of the movement of this shell preparatory to a succeeding partial rotation to the right, the shaft is locked by the jamming of the members 9, 12 and 7 and no back-lash is permitted. The back and forth movement of the driving shell therefore gives an intermittent rotary motion of the shaft 2 in one direction only.

The two shells 7 and 17 have telescoping collars 22 and 23, respectively, so that the shell 17 has a bearing on the shell 7 as well as the bearing on the shaft 2 through the hub 18 and all of the mechanism is securely housed and protected by the two shells in a sightly manner.

In the present instance, the driving shell 17 has secured thereto a crank arm 24 to which is pivoted at 25 a link 26 that may be connected to any suitable part of an engine or other source of power to vibrate the arm. A nut 27 screwed onto the end of the shaft 2 holds all of the parts assembled on the latter and if desired, a hand crank may be attached beneath this nut.

I claim as my invention:

1. The combination with a support, a shaft carried thereby and a fixed brake shell surrounding the shaft, of a brake member fixed to the shaft within the brake shell, a clutch acting between the latter and the brake member to lock those two parts together when the shaft is turned in one direction and to permit their relative movement when the shaft is turned in the other direction, a driving member also fixed to the shaft and disposed against the brake member, a driving shell embracing the driving member and a clutch acting between the latter and the driving shell, to lock those two parts together when the shaft is turned in a direction releasing the brake and to permit their relative movement in the opposite direction.

2. The combination with a support, a shaft projecting therefrom and a fixed brake shell surrounding the shaft, of a brake member fixed to the shaft within the brake shell, a clutch acting between the latter and the brake member to lock those two parts together when the shaft is turned in one direction and to permit their relative movement when the shaft is turned in the other direction, a driving member also fixed to the shaft and disposed against the brake member, a driving shell embracing the driving member and coöperating with the brake shell to form a casing for both the driving and brake members and a clutch acting between the driving member and the driving shell to lock those two parts together when the shaft is turned in a direction releasing the brake and to permit their relative movement in the opposite direction.

MERTON C. ARMSTRONG.

Witnesses:
RUSSELL B. GRIFFITH,
AGNES NESBITT BISSELL.

Copies of this patent may be obtained for five cents each, by addressing the "Commissioner of Patents, Washington, D. C."